V. KUBELKA.
TIRE.
APPLICATION FILED JAN. 25, 1922.

1,429,209.

Patented Sept. 12, 1922.

WITNESSES
Edw. Thorpe
F. J. Foster

INVENTOR
V. Kubelka
BY
ATTORNEYS

Patented Sept. 12, 1922.

1,429,209

UNITED STATES PATENT OFFICE.

VRATISLAV KUBELKA, OF BROOKLYN, NEW YORK.

TIRE.

Application filed January 25, 1922. Serial No. 531,666.

*To all whom it may concern:*

Be it known that I, VRATISLAV KUBELKA, a citizen of the United States, and a resident of the city of New York, borough of Brooklyn, in the county of Kings and State of New York, have invented a new and Improved Tire, of which the following is a full, clear, and exact description.

This invention relates to improvements in tires, particularly to a tire of the general character disclosed in Letters Patent of the United States #1,383,822, granted to me on July 5th, 1921. In this patent I disclosed an ordinary tire shoe adapted for use with a pneumatic tube, in which an annular chain of spring links was substituted for the tube, and means was provided for preventing engagement of the links with the inner surface of the tire shoe.

This invention relates more particularly to a tire of the same general character, but which is designed for use on trucks, an object of the invention being to provide means for cushioning an ordinary solid tire.

A further object is to provide a novel form of spring link for use in the chain, and a link so constructed that it may bear directly against the inner surface of the body of the tire without harming the same.

A still further object is to provide a tire of this character for trucks or other heavy motor vehicles now using solid tires, which will be simple and practical in construction, durable and efficient in use, and unlikely to need repair.

With these and other objects in view, the invention consists in certain novel features of construction and combinations and arrangements of parts as will be more fully hereinafter described and pointed out in the claims.

In the accompanying drawings:—

Figure 1:
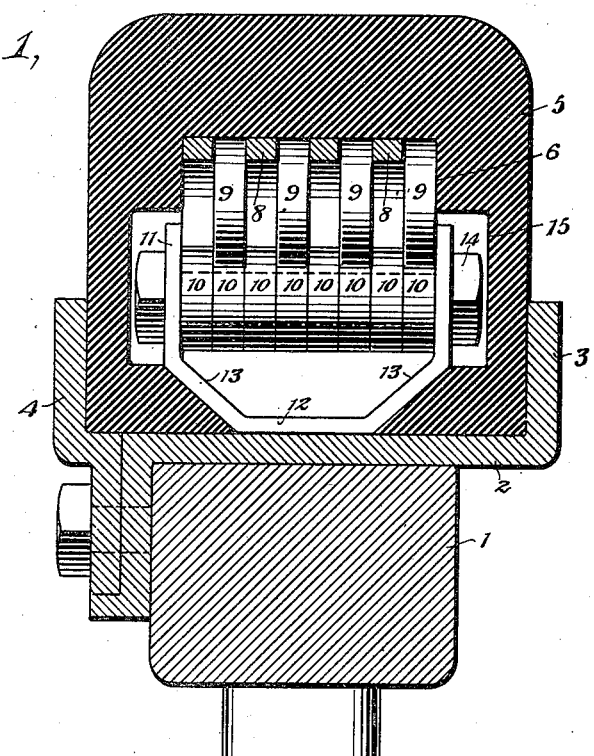
Figure 1 is a view in section through my improved tire.
Figure 2:
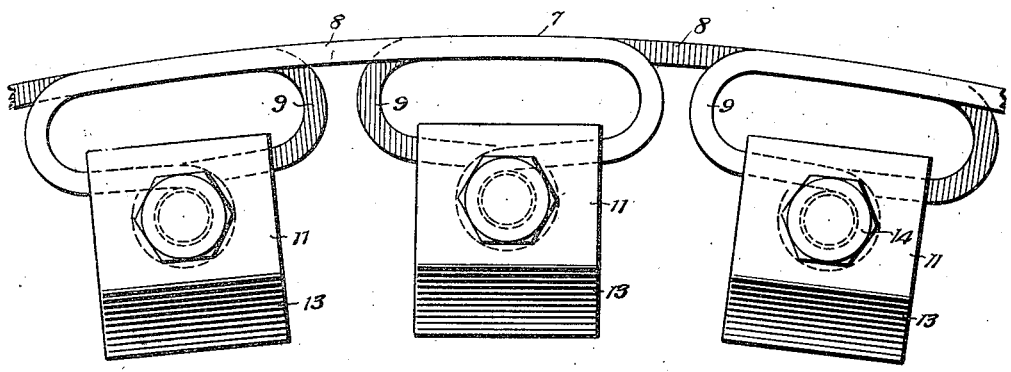
Figure 2 is a fragmentary view in side elevation of the chain and spring links.
Figure 3:
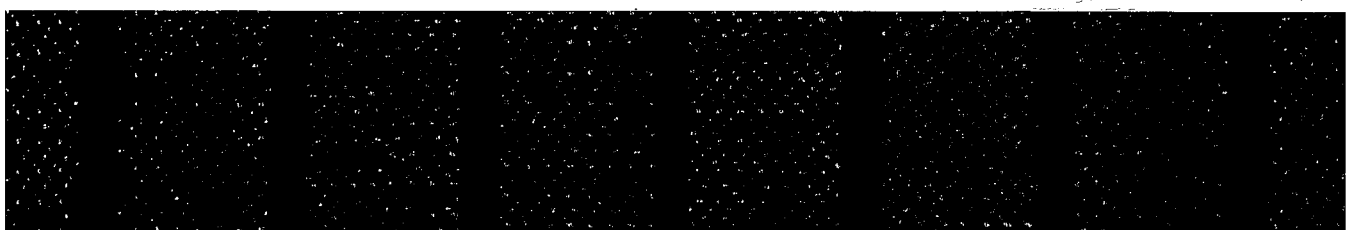
Figure 3 is an enlarged view in side elevation of one of the links in the chain.

Referring in detail to the drawings, 1 represents a wheel felly upon which is mounted a rim comprising a stationary member 2 carrying a flange 3 and a bolted-on flanged ring 4 adapted to cooperate with the flange 3 in retaining a tire 5 in place. The body of the tire is substantially the same as an ordinary solid tire except for the fact that it is recessed, as indicated at 6, to accommodate my improved resilient chain. This chain is formed of a number of spring links 7, seen most clearly in Figure 3.

Each link of the chain comprises an elongated body portion 8 bent back upon itself at each end to provide spring loops 9, the extremities of said loops being rolled backwardly to provide eyes 10. These links are arranged preferably in aligned groups of three or four links, although I do not wish to be limited to any particular number. Each group of links has its eyes 10 in alignment with the eyes of an adjacent group, the eyes of one group of links fitting between the eyes of the links of an adjacent group.

Substantially U-shaped brackets 11 straddle the aligned eyes. These brackets have their intermediate portions located against the rim 2 and include angular arms 13 conforming to the shape of the walls of the recess 6 in the tire and straddling the aligned eyes. Bolts 14 connecting the arms of the brackets are passed through the eyes and serve to pivotally connect the groups of links. It will be noted that when the links are arranged, as hereinbefore described, the loops 9 of one group of links will be located between the body portions 8 of an adjacent group of links. The elongated body portions of the links bear directly against the inner surface of the body portion of the tire. Annular recesses or pockets 15 formed in the body of the tire accommodate the heads of the bolts 14 so that there is no chafing of the bolts against the tire.

From the foregoing description, it will be apparent that I provide a tire of equal durability with any solid tire now on the market, yet of much greater resiliency. The filler band disclosed in my prior patent is entirely done away with, the cost of manufacture is lessened and the novel form of link employed adds greatly to the efficiency of the spring action desired.

Although I have illustrated one of the preferred embodiments of my invention, it will be evident that various slight changes and alterations might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

I claim:

1. In a tire construction, the combination with a rim, of a solid tire body, on the rim having an annular recess therein, an annular chain of spring links supported on the rim and bearing directly against the inner surface of the tire body.

2. In a tire construction, the combination with a rim, of a solid tire on the rim having a recess therein, an annular chain of spring links accommodated in said recess, said links being arranged in groups pivotally connected together, brackets straddling the links at their points of pivotal connection, bolts passed through the brackets and connecting the links, said brackets supported directly in the rim, and said tire body having annular pockets therein communicating with the recess accommodating the heads and nuts of said bolts and providing clearance therefor upon compression of the tire.

3. In a tire construction, the combination with a rim, of a solid tire on the rim having a recess therein, an annular chain of spring links accommodated in said recess, said links being arranged in groups pivotally connected together, brackets straddling the links at their points of pivotal connection, and bolts passed through the brackets and connecting the links, said brackets supported directly in the rim, the links of said chain comprising elongated body portions bent back upon themselves to form spring loops, said loops rolled back to provide eyes receiving the bolts.

4. In a tire construction, the combination with a rim, of a solid tire on the rim having a recess therein, an annular chain of spring links accommodated in said recess, said links being arranged in groups pivotally connected together, brackets straddling the links at their points of pivotal connection, and bolts passed through the brackets and connecting the links, said brackets supported directly in the rim, the links of said chain comprising elongated body portions bent back upon themselves to form spring loops, said loops rolled back to provide eyes receiving the bolts, said elongated body portions of the links bearing directly against the inner surface of the tire body.

5. In a tire construction, the combination with a rim, of a solid tire on the rim having a recess therein, an annular chain of spring links accommodated in said recess, said links being arranged in groups pivotally connected together, brackets straddling the links at their points of pivotal connection, and bolts passed through the brackets and connecting the links, said brackets supported directly in the rim, the links of said chain comprising elongated body portions bent back upon themselves to form spring loops, said loops rolled back to provide eyes receiving the bolts, said elongated body portions of the links bearing directly against the inner surface of the tire body, said groups of links being so arranged that the body portions of one group of links receive the loops of the adjacent groups between them.

6. In a tire construction, the combination with a rim, of a solid tire on the rim having a recess therein, an annular chain of spring links accommodated in said recess, said links being arranged in groups pivotally connected together, brackets straddling the links at their points of pivotal connection, and bolts passed through the brackets and connecting the links, said brackets supported directly in the rim, the links of said chain comprising elongated body portions bent back upon themselves to form spring loops, said loops rolled back to provide eyes receiving the bolts, heads on the bolts, and means preventing contact of said bolt heads with the inner surface of the tire body.

VRATISLAV KUBELKA.